Jan. 28, 1958  L. GALATERI  2,821,333
BAS-RELIEF DRESSMAKER'S MODEL AND METHOD FOR THE
CONSTRUCTION THEREOF
Filed Nov. 1, 1954
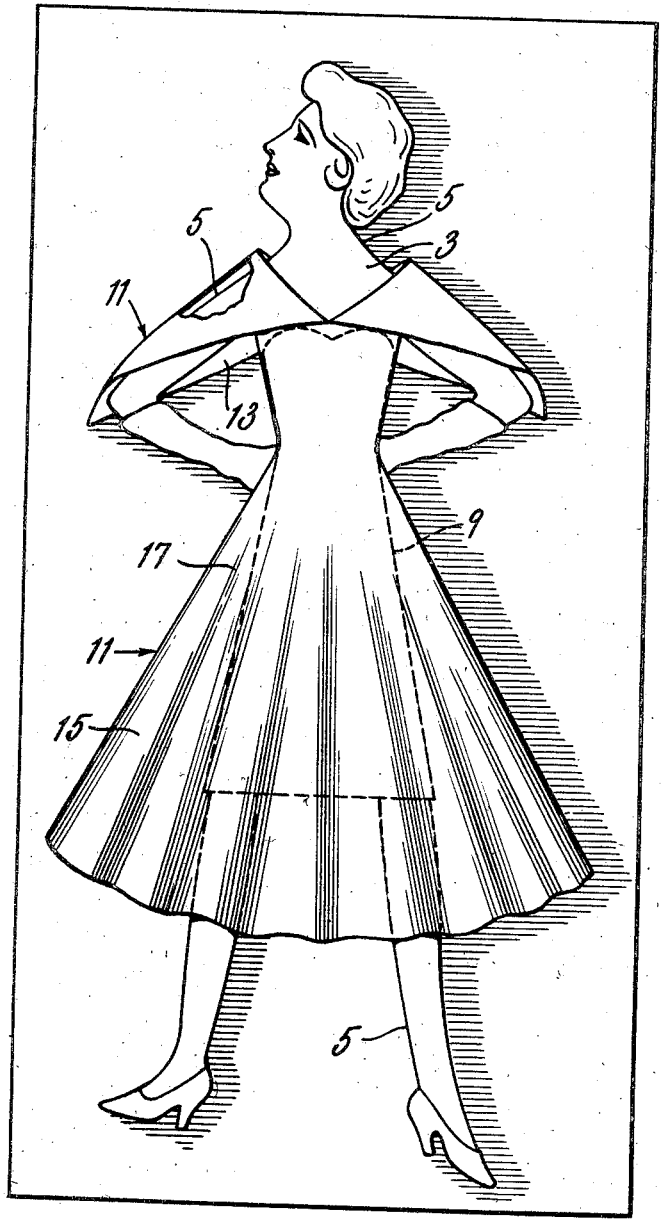
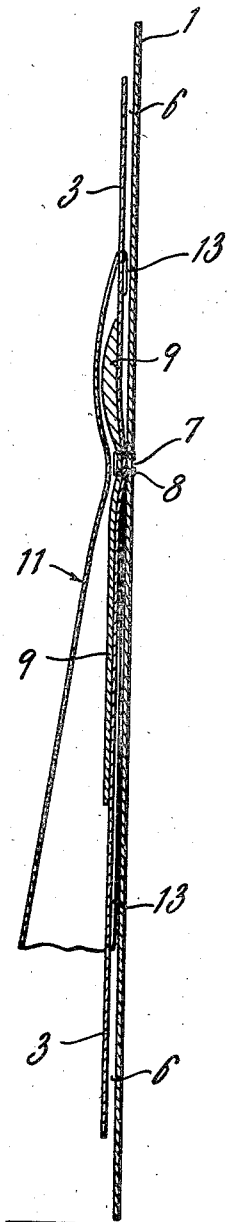
Fig. 1
Fig. 2
INVENTOR.
LELIO GALATERI
BY

United States Patent Office 2,821,333
Patented Jan. 28, 1958

2,821,333

BAS-RELIEF DRESSMAKER'S MODEL AND METHOD FOR THE CONSTRUCTION THEREOF

Lelio Galateri, Naples, Italy

Application November 1, 1954, Serial No. 466,185

Claims priority, application Italy October 31, 1953

1 Claim. (Cl. 223—68)

This invention relates to demonstration devices for dresses, garments and the like.

The presentation of fashion designs, both of women's dresses and men's suits has always constituted a major difficulty for fashion houses. The manufacturers generally overcome this difficulty by using live models whereas smaller dress firms, which cannot afford the cost of trained models, had to resort to black and white or color drawings, or illustrations published in fashion journals or magazines. These solutions do not produce in an effective and faithful manner natural attractiveness of the dress or suit, any draping effects and demonstration of the texture of the fabrics.

Some use has been made of transparent two-dimensional cutouts or frames, which allow the display of the type and nature of the fabric, but even this form of presentation proved scarcely effective, because the fabric is rather perceived in flat condition and without draping effects which, particularly when using silks, glittering fabrics and particularly brocade or metal thread-woven cloth, necessarily require inspection and exposure from different angles of light incidence.

The present invention provides means facilitating the creation of models or dummies capable of displaying a more realistic aspect of the finished dress or suits, showing to best advantage all features of tailoring as well as of fabrics used.

According to the invention a suitable flat display board backing of predetermined dimensions is provided which is made of wood, cardboard, plywood or similar material to which is attached a dummy piece delineating an outline contour of a body on which fabric may be applied to simulate a suit, dress or the like.

Filling or padding material may then be applied to this contoured dummy, so as to form a bas-relief representing the form of the human body. Thereafter, the dress or suit fabric is fitted to the bas-relief form. This operation constitutes the most characteristic stage of the preparation of the model or dummy. The dress or suit, of course, will then be simulated in appearance as it will be prepared by the tailor or dressmaker, and its characteristics will therefore necessarily be all apparent. In this stage, the problem is how to apply the fabric to the bas-relief model.

Once the dress or suit fabric is prepared on the same scale as the drawing, the fabric will be fastened, by using an appropriate adhesive, to the parts of the bas-relief dummy edges to which the dress or suit would naturally adhere in the position represented by the model and folded over and behind the edge portions of the dummy. In general, for instance, the suit or dress will adhere at the neck, hips, upper part of the forearm and shoulders, the remaining parts being allowed to fall or extend in natural folds away from said dummy and in draping condition, giving a surprisingly lifelike impression, which will be even more effective when the dress contains voile and gauze parts.

In the accompanying drawing illustrating one embodiment of a display according to the invention Fig. 1 shows the display in elevation, whereas Fig. 2 is a vertical cross-section of Fig. 1, showing details of the display.

As will readily be seen from the drawing, to a flat backing indicated by numeral 1, which may be made of wood, cardboard, plywood or similar material, is secured a cut out dummy 3, simulating an outline of a human body. The dummy which may also be made of wood, cardboard, plywood or similar material terminates in side edge portions 5, and is secured at substantially the center 7 thereof by means of a fastener 8, to the cardboard backing 1. The aforesaid edge portions 5 of the dummy remain, therefore, slightly spaced from the display board backing 1 forming spaces 6 therebetween. To the appropriate parts of the surface of the dummy which faces away from the cardboard display backing 1 is applied a padding layer 9 which forms a bas-relief portion, approximating in cross-section the contour of a portion of the human body. Fabric 11 is draped about dummy 3, and portions 13 of said fabric are folded over and behind some of the edge portions 5 of the dummy so that the fabric extends at least partly between the backing and the dummy. Other portions 15 of the fabric which is loosely draped over the surface of the dummy which is remote from the cardboard backing 1 form natural folds 17. A draping effect of the fabric is thus obtained.

The principles set forth for suits and dresses also apply to intimate garments in general, and particularly to ladies' lingerie for which the principle outlined above will be followed i. e. attaching to the bas-relief the parts of the garment that generally adhere to or come to lie against the body when the garment is worn.

Experience has shown that, for effectiveness and lifelike effects, the relative thickness of the bas-relief, measured perpendicularly to the surface on which the model or dummy is applied, has no great importance. In practice, a few centimeters suffice to give a marked three-dimensional effect, so that the models or dummies built in accordance with this invention can be easily packed in cases, where they lie parallel to each other and take very little space.

The models or dummies according to this invention can also be used for the preparation of animated figures in three-dimensional cinematography.

It can, therefore, be seen that a dressmaker's display has been provided which comprises a flat display board backing of predetermined dimensions, a cut out dummy terminating in edge portions simulating an outline of a human body, the dummy being secured to the display board backing at the dummy's central part so that the edge portions of the dummy are slightly spaced away from the display board backing, a bas-relief padding is applied at predetermined locations to the dummy's surface which is away from the backing, the padding approximating in cross-section the contour of the human body, a fabric to simulate a garment being draped about said dummy and some portions of said fabric being folded over and behind some of the edge portions of the dummy, so that the fabric extends partly between the backing and the dummy, whereas another portion of the fabric extends outwardly from the remaining edge portions of the dummy and is spaced from the backing by the padding and said dummy, so that the fabric forms natural folds and a draping effect thereof is obtained forwardly of said dummy and said backing.

Having thus described the invention, what is claimed as new and desired to be secured by Letters Patent, is:

A dressmaker's display comprising a flat display board backing of predetermined dimensions, a cut out board representing a dummy terminating in edge portions simulating an outline of a human body and secured to said display board backing at substantially the center part of said dummy, said edge portions of said dummy being slightly spaced from said display board backing, bas-relief padding secured at predetermined locations to the forward surface of said dummy remote from said backing, said padding being an approximation in cross-section of the contour of predetermined parts of the human body, a fabric simulating a garment draped about said dummy and with a portion of said fabric folded over some of said edge portions of said dummy and secured to the latter, so that said fabric extends at least partly between said backing and said dummy, another portion of said fabric extending outwardly from the remaining edge portions of said dummy and being spaced from said backing by said padding and said dummy and forming natural folds thereat, to thereby obtain a draping effect of the fabric forwardly of said dummy and said backing.

References Cited in the file of this patent

UNITED STATES PATENTS 1,608,282     Whitney ---------------- Nov. 23, 1926